United States Patent
Wett

Patent Number: 5,872,945
Date of Patent: Feb. 16, 1999

[54] MX BUS TRANSLATION TO NEW SYSTEM BUS PROTOCOL

[75] Inventor: Thomas E. Wett, Chandler, Ariz.

[73] Assignee: Intel Corporation, Santa Clara, Calif.

[21] Appl. No.: 749,084

[22] Filed: Nov. 14, 1996

Related U.S. Application Data

[63] Continuation of Ser. No. 97,296, Jul. 26, 1993, abandoned.

[51] Int. Cl.⁶ ................................................ G06F 13/00
[52] U.S. Cl. ........................ 395/306; 395/280; 395/284; 395/306; 395/307; 395/308; 395/309; 395/310
[58] Field of Search .................................. 395/280, 306, 395/307, 308, 309, 310

[56] References Cited

U.S. PATENT DOCUMENTS

| | | | |
|---|---|---|---|
| 4,802,119 | 1/1989 | Heene et al. | 364/900 |
| 4,827,408 | 5/1989 | Shimomura | 395/425 |
| 5,228,134 | 7/1993 | MacWilliams et al. | 395/425 |
| 5,276,839 | 1/1994 | Robb et al. | 395/425 |
| 5,317,711 | 5/1994 | Bourekas et al. | 395/425 |
| 5,349,565 | 9/1994 | Wu et al. | 365/230.08 |
| 5,379,384 | 1/1995 | Solomon | 395/325 |
| 5,388,215 | 2/1995 | Baker et al. | 395/200 |
| 5,390,356 | 2/1995 | Houlberg | 395/800 |
| 5,446,849 | 8/1995 | Minagawa et al. | 395/375 |
| 5,467,295 | 11/1995 | Young et al. | 395/200.05 |
| 5,473,770 | 12/1995 | Vrba | 395/433 |
| 5,546,391 | 8/1996 | Hochschild et al. | 370/60 |
| 5,590,349 | 12/1996 | Robinson et al. | 395/800 |
| 5,617,553 | 4/1997 | Minagawa et al. | 395/416 |
| 5,659,748 | 8/1997 | Kennedy | 395/652 |
| 5,684,980 | 11/1997 | Casselman | 395/500 |

*Primary Examiner*—Meng-Ai T. An
*Assistant Examiner*—Valerie Darbe
*Attorney, Agent, or Firm*—Blakely, Sokoloff, Taylor & Zafman LLP

[57] ABSTRACT

A bus translator is provided to translate the internal bus structure of a self-contained processor system to a system bus which is easily compatible with a plurality of different external components. In particular, the bus translator translates the packetized multiplexed internal bus to a de-multiplexed bus. The translator further provides the ability to add wait states to the transactions in order to accommodate slower memories and devices coupled to the system bus. Furthermore, the translator accommodates bus burst logic by providing an auto-increment addressing capability. In addition, as the processor operates on 32-bit words and coupled devices may operate on a smaller word size, the bus translator of the present invention provides a byte enable register file for performing byte operations within the 32-bit word operations of the system. Finally, the bus translator also provides accurate parity generation and checking on a byte basis. An external boot feature for the self-contained processor system allows the reading of start-up configuration data from internal non-volatile memory or system memory. Furthermore, address mapping and chip enable control allow the user to access additional information from the non-volatile memory regardless of the boot mode chosen.

18 Claims, 5 Drawing Sheets

| SIGNAL NAME | TYPE | FUNCTION |
| --- | --- | --- |
| CLK25A | OUT | Clock used for external interface logic. |
| PHASE | OUT | CLK25A/2 clock qualifier signal. Used for clock enables of external interface logic. Note that the system bus operate at one-half the frequency of the processor. |
| READY# | IN | An input signal for inserting wait states between data words of a burst access. The assertion of this signal indicates when data can be sampled (read) or removed (write) by the processor. |
| CYCLE# | OUT | Signifies the address cycle of a system bus access. |
| W_R | OUT | The system bus write/read line. A low denotes a read while a high denotes a write. |
| FBURST# | OUT | Denotes the final data cycle of a system bus access. It will be asserted for the complete duration of the last data cycle. |
| CPUHOLD# | IN | This signal is used by a secondary system bus master to request use of the bus. When this signal is sampled asserted, the bus tristates and asserts the signal CPUHLDA# when it is finished with the bus. |
| CPUHLDA# | OUT | This signal asserts when the system bus is being relinquished to a secondary bus master. |

FIG. 3

| ADDRESS RANGE | INT/EXT LOGIC HIGH | INT/EXT LOGIC LOW |
| --- | --- | --- |
| E | Reserved Processor Space | Reserved Processor Space |
| D | Backside Memory | Backside Memory |
| C | System Memory | System Memory |
| B | Non-Volatile | Non-Volatile |
| A | Non-Volatile | System Memory |

FIG. 5

MX BUS TRANSLATION TO NEW SYSTEM BUS PROTOCOL

This is a continuation of application No. 08/097,296, filed Jul. 26, 1993, now abandoned.

BACKGROUND OF THE INVENTION

1. Field of the Invention

The present invention relates to an apparatus and method for translating a multiplexed packetized bus into a de-multiplexed bus which is easily accessible by external components. Furthermore, the present invention relates a structure and method for providing an internal and external boot for a self-contained processor system.

2. Art Background

A self-contained processor system includes components and features such as a processor, volatile memory, non-volatile memory, cache memory, timers, serial ports, etc. This system may exist on a single PCB (printed circuit board) or MCM (multi-chip module). Typically, a user or external device has very limited access to the internal components of the system. For example, the processor's non-volatile memory where start-up code is usually stored may be completely inaccessible to the external user.

To reduce the design cycle time and increase integration, MCM and PCB processor systems have become very widely used. The time and knowledge required to design with these types of systems is minimal, as the interface to the processor's bus had been previously designed and the external interface to the system bus typically is straight forward.

However, as the processor system is designed to be self-contained, internal bus operations and protocols are not designed with ease-of-use and external access requirements in mind. Therefor, access externally by a device coupled to operate with the self-contained system, or a user accessing the system for operational or debugging purposes is quite difficult.

A processor typically on boot-up will look for its configuration data at some predefined address in non-volatile memory. This address is fixed and cannot be changed by the user. The configuration data is generally stored in non-volatile memory off of the processor's local bus. In a self-contained processor system, this non-volatile memory is inaccessible to the external user.

SUMMARY OF THE INVENTION

It is an object of the present invention to provide the capability to boot a self-contained processor system from external memory.

It is an object of the present invention to provide external access to internal memory in a limited access, self-contained processor system.

It is an object of the present invention to provide a bus translator to translate information transmitted over a multiplexed, packetized burst bus and convert it to a simple, easy-to-use de-multiplexed system bus accessible to a user.

The self-contained processor system of the present invention contains a number of features to enable or ease external access by a user or a device. A bus translator is provided which translates information between the processor's multiplexed, packetized burst bus protocol format and a simple, de-multiplexed system bus that is readily accessible to the external user. In particular, the bus translator converts a 32-bit multiplexed bus to a 32-bit de-multiplexed bus, provides the external device or user a wait-state capability, auto increments lower address bits to accommodate burst transmissions, provides byte-wide parity generation and parity checking for data, and provides byte read and write operations.

Circuitry to perform a system boot from external memory is also provided. This capability permits the external user to boot-up the processor from code located in external memory and provides an external device or user access to internal non-volatile memory regardless of the boot mode chosen. In the preferred embodiment, the external boot circuitry allows the user to select a bit to indicate that configuration data referenced during the boot-up of the processor is located in external system memory. In addition, the user has access to most of the internal non-volatile memory.

BRIEF DESCRIPTION OF THE DRAWINGS

The objects, features and advantages of the present invention will become apparent to one skilled in the art from the following detailed description in which:

FIG. 3 is a table describing control signals initialized by the control logic in the bus translator.

FIG. 5 is a table showing exemplary addresses for memory in one embodiment of the present invention.

DETAILED DESCRIPTION OF THE INVENTION

In the following description for purposes of explanation numerous details are set forth in order to provide a thorough understanding of the present invention. However, it will be apparent to one skilled in the art that these specific details are not required in order to practice the invention. In other instances, well known electrical structures and circuits are shown in block diagram form in order not to obscure the present invention unnecessarily.

Figure 1:
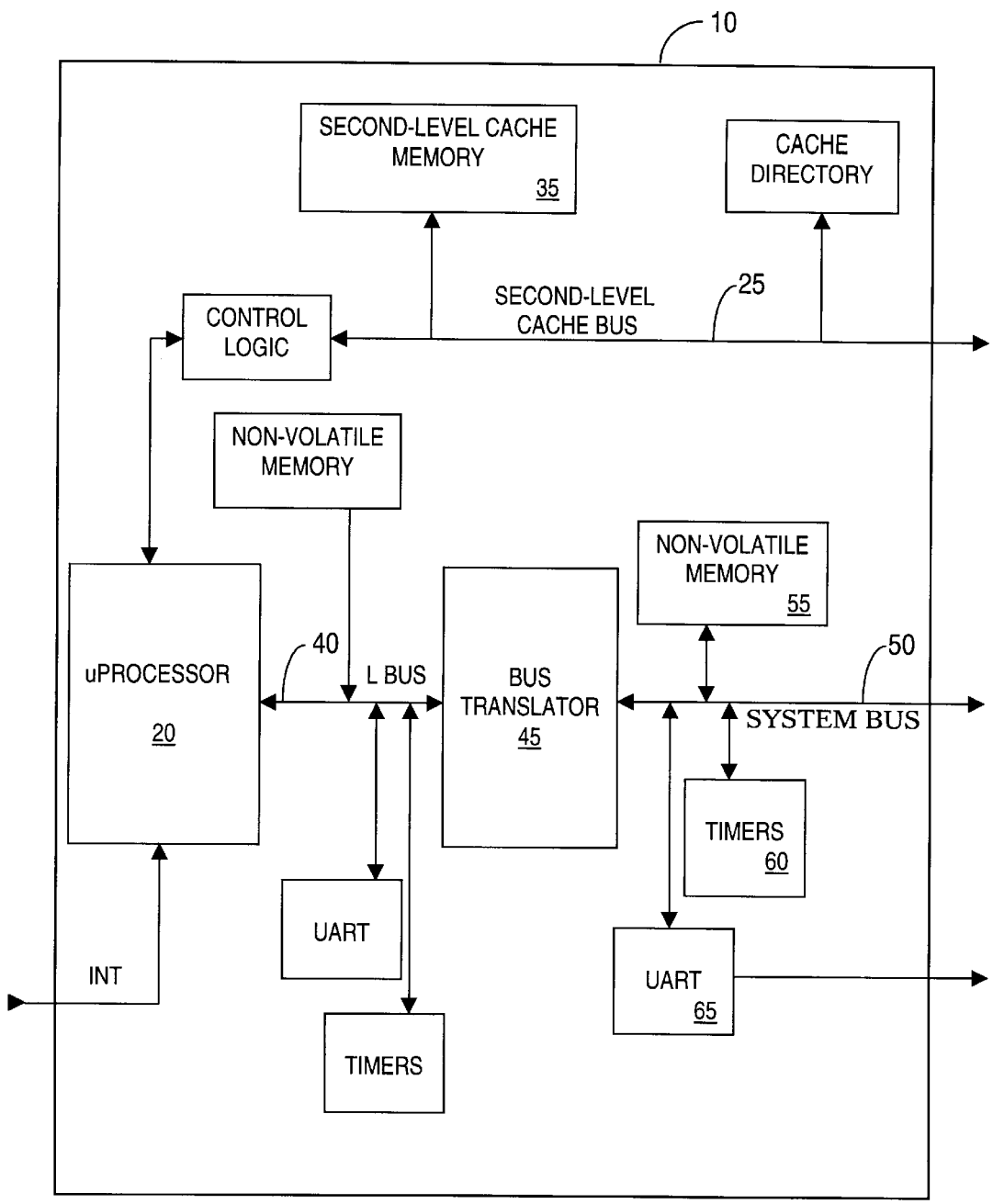
FIG. 1 is a block diagram illustration of a self-contained processor system of the present invention.

An exemplary self-contained processor system incorporating the features of the present invention is shown in FIG. 1. The system 10 includes a processor 20, such as an Intel i960® MM/MX, manufactured by Intel Corporation, Santa Clara, Calif. The microprocessor 20 communicates with a second-level cache 35 through a high speed data bus 25 which operates at the clock cycle rate of the processor 20. The second bus, the local bus (LBUS) 40, is a packetized multiplexed bus which provides access to boot-up memory 47, configuration data, and input/output devices. In the present embodiment, the bus 40 operates at one-half the cycle rate of the processor 20 to enable slower input/output and memory devices to communicate with the processor 20. However, the bus structure is cumbersome to interface with as most input/output and memory devices do not interface cleanly to a multiplexed packetized bus. In addition, the bus does not interface easily to slower devices. Therefore, bus translator 45 is utilized to translate the information communicated between the microprocessor 20 and devices. In particular, a system bus 50 is created which enables easy access to system memory and user I/O devices.

The bus translator 45 not only translates the LBUS 40 protocol to a system bus 50 protocol, which is easily interfaced by a number of I/O and memory devices, but further enhances the capability of the system bus 50 by enabling the addition of wait state capability, auto increment of burst address, and byte-wide parity.

Figure 2:
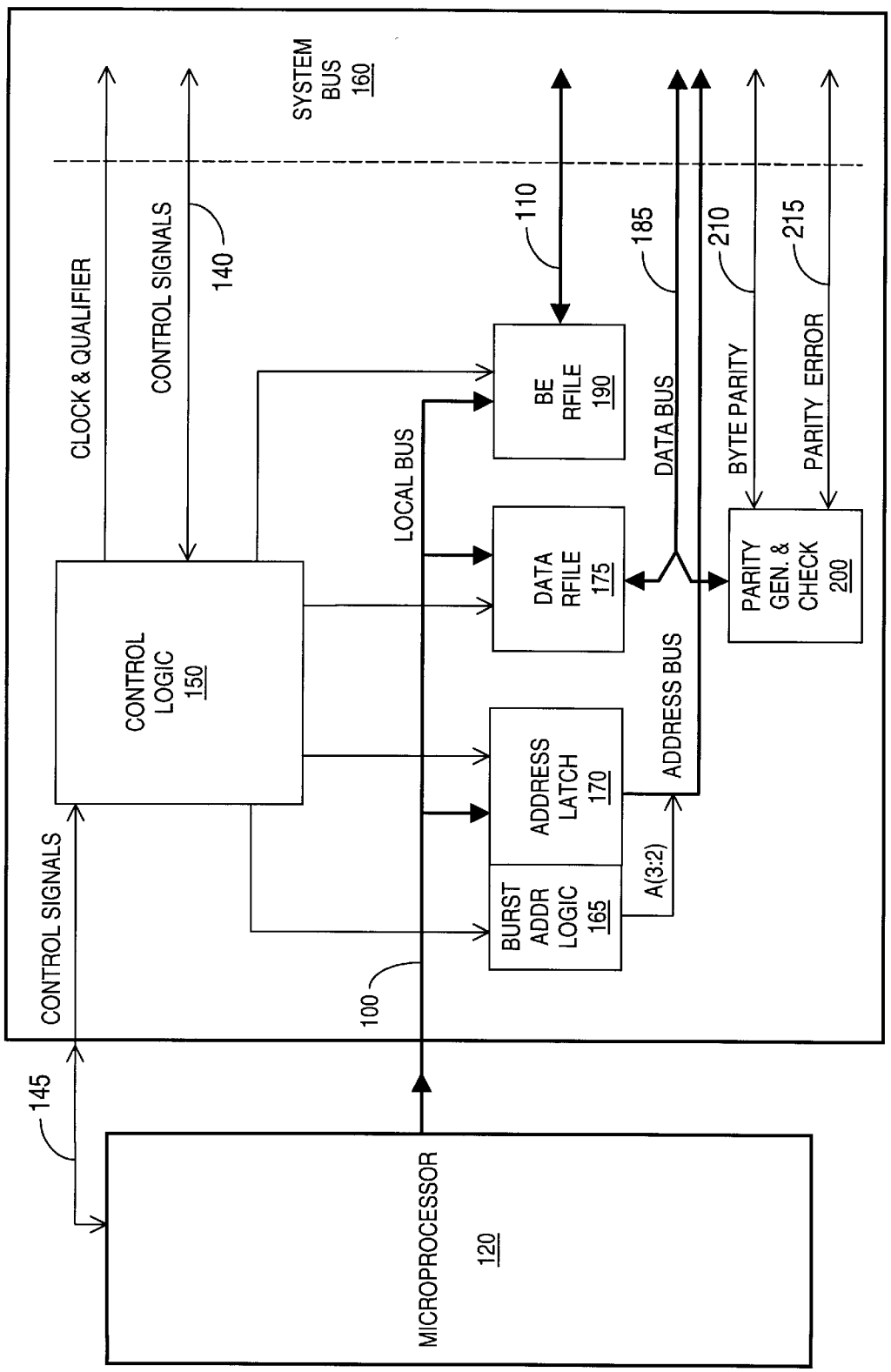
FIG. 2 is a block diagram of the bus translator of the present invention.

A block diagram of the bus translator is shown in FIG. 2. The input/output data to/from the microprocessor 120 is communicated through a multiplexed packetized bus 100, referred to as the local bus, to communicate with memory and I/O devices. The bus translator converts the information communicated across the local bus 100 to the protocol of the system bus 110. The system bus 110 is a de-multiplexed bus and includes a variety of features to provide an easy interface to various types of memory and I/O devices.

One feature the bus translator provides is the capability to add wait states to transmissions on the system bus to permit slower I/O and memory devices to operate with the faster processor 120. Although the local bus 100 operates at a slower clock rate than the processor 120, the clock rate is fixed and still faster than some I/O and memory devices. The mechanism for inserting wait states is provided by the data rfile 175 located on the bus translator and by the ready control signal input 140 which is issued by the device communicating on the system bus. The data rfile 175 temporarily stores write data provided by the processor 120 to be written to the device and read data read from the device to be provided to the processor during a read operation. Data is written to and read from the data rfile 175 by the processor 120 at the data rate of the local bus 100. However, the data written from the data rfile 175 to the device and data read from the device and stored in the data rfile is communicated across the system bus in accordance with the state of the ready signal. This input control signal is asserted by external logic associated with the communicating device, resulting in wait states being inserted between transmissions of data words of a burst access on the system bus. The assertion of the ready signal indicates when the device is ready to perform a communication, that is, when data can be read or written by the bus translator on behalf of the processor 120. For example, a slower device may take two to three clocks cycles to send one data word of a burst read transaction. The ready signal may then be asserted to prevent the bus translator from expecting the next data word immediately after the transmitted data word.

To perform a read operation, for example, the bus translator manages the system bus to convey the read request of the processor 120 to the device and does not issue a response to processor 120 across the local bus until all read data has been received from the device across the system bus and stored in the data rfile in the bus translator. At that time, the data is communicated to the processor. To perform a write operation, the bus translator stores the data, received from the processor and to be written to the I/O device or external memory, in the data rfile 175 to complete the transaction with the processor 120 and subsequently manages the timing of the transmission of the data across the system bus 160 to the I/O device or external memory using the ready control signal to identify when the I/O/memory device is ready to receive data.

Preferably, the bus translator allows the transfer of bus ownership on the system bus 160 by use of two control signals, CPUHOLD# and CPUHLDA#. For example, in the present embodiment, the external user of the system bus 160 issues a bus ownership change by issuing a CPUHOLD# control signal 140. The bus ownership change is then granted by the bus translator issuing a CPUHLDA# control signal 140. When the external user is finished with the bus, the CPUHOLD# control signal 140 is issued to relinquish the bus.

Various control signals are communicated between the control logic 150 of the bus translator and the external devices coupled to the system bus 160 in order to control the operation of the system bus. Exemplary control signals are listed in the table of FIG. 3.

As the local bus 100 is a multiplexed, packetized burst bus in which address and data information are multiplexed on the same bus lines, and the system bus is a de-multiplexed burst bus which includes separate address and data bus lines, the bus translator latches the incoming address from the processor 120 when the address is transmitted. This address is held in a temporary holding register 170. For example, during a write transaction, the address is latched and, once the data is received, the bus translator outputs the address on the address lines and the data on the data lines of the system bus.

During processor read and write accesses, the processor 120 initiates a request by identifying a particular address to be accessed and an associated burst size, which denotes the number of data words (e.g., 1 to 4 words) to be read or written starting at the identified address. The address is stored in the holding register 170 and is used by the burst address logic during a transaction to access an external device via the system bus 160. The burst address logic 165 provides system memory devices with byte addressing during word burst transactions. As noted above, a multiplexed burst bus, like the local bus, will only provide one address per transaction. As the system bus includes separate address lines, for each word transmitted the associated address is transmitted. Therefore, the word address must be provided for each word transacted on the system bus. The burst address logic 165 provides the system bus compatible burst addressing capability by accessing the base address A(31:4) located in the holding register 170 and automatically incrementing address bits A(3:2) to access each subsequent word of the original burst request on the system bus. The control logic 150 provides the size of the burst of the access to determine the number of addresses to be generated and controls the issuance of the addresses to be timed with the transmission of the corresponding data on the data lines.

The data rfile 175 is a register file that functions as a temporary data storage area between the local bus and system bus. Preferably, the data rfile is a 4 word deep by 32-bit register file. This register file 175 is utilized to provide wait-state capability on the slower system bus since the faster, packetized local bus operates at zero-wait-states. All data to and from the system bus is temporarily stored in the register file before transfer to the external device connected to the system bus such that wait states can be inserted on the bus as necessary to accommodate the slower external devices. The control logic 150 provides the necessary read and write signals to control the input/output to/from the register file.

The BE rfile 190 functions as a temporary storage area for byte enable signals communicated between the local bus and system bus. Preferably, the BE rfile 190 is a 4 word deep by 4-bit register file. During microprocessor write operations, this register file timely latches the byte enable signal issued by the processor and subsequently sends byte enable signals out on the system bus with each data word in order to identify the bytes of the word which are affected by the operation. During microprocessor read operations, the register file stores the byte enable signals sent by the external device on the system bus. When the bus translator returns the read data to the microprocessor, the register file issues the corresponding byte enable signals.

The byte enable signals stored in the BE rfile 190 are used to identify to the external device which bytes of the 32-bit word accessed during the transaction are valid. There are four byte enable signals or bits associated with a word. If the byte enable signal for a particular byte is a logic zero then the byte accessed is written or read. If the byte enable is a logic one then the byte accessed is ignored, i.e., not written or read. The control logic 150 provides the necessary read and write signals to the register file to control the storage and issuance of byte enable signals to the external device and processor.

In particular on the system bus it is of particular importance to insure the corresponding byte enable signals are issued with the issuance of the corresponding data and address information. Therefore, if the external device controls the transmission of data, thereby causing wait states to be generated between data words, the issuance of the corresponding byte enable signals should be correspondingly controlled according to the Ready control signal such that the correct byte enable signal is issued with the data.

The bus translator also provides for the generation and checking of parity on a byte by byte basis even though the local bus may not provide parity or may only provide word parity. The parity generation and check logic 200 generates and checks byte parity on the system bus 160 for each data word accessed by the processor. During processor write operations, the parity generation circuitry 200 computes a parity, for example, even parity, for each byte and sends out a corresponding data bit indicating the parity to the system bus 160 for receipt by the external device. Thus, for a 4 byte word, there are four parity bits for every data word.

In the present embodiment, the bits are delayed one system bus dock to allow the external logic of the external device to compute and compare the parity received against the parity determined from the actual data. During a processor read operation, an external device supplies the byte parity bits for a word one system bus dock after the actual data word sent. The parity checking circuitry 200 then compares the parity received vs. the parity calculated on the actual data word. If a parity mismatch occurs on any of the bytes, a parity error signal is issued out on the system bus. The external device then performs the necessary action when the parity error signal is received. Preferably, the byte parity is sent along bi-directional bus line 210 and byte parity error signals are issued along signal line 215.

A self-contained processor system on startup (or boot) will look for configuration data at some predefined address of internal memory. This predefined address is fixed and cannot be changed by the user. The configuration data, usually stored in non-volatile memory coupled of the local bus, is necessary to provide the processor with the modes of operation of the system that are to be utilized.

Figure 4:
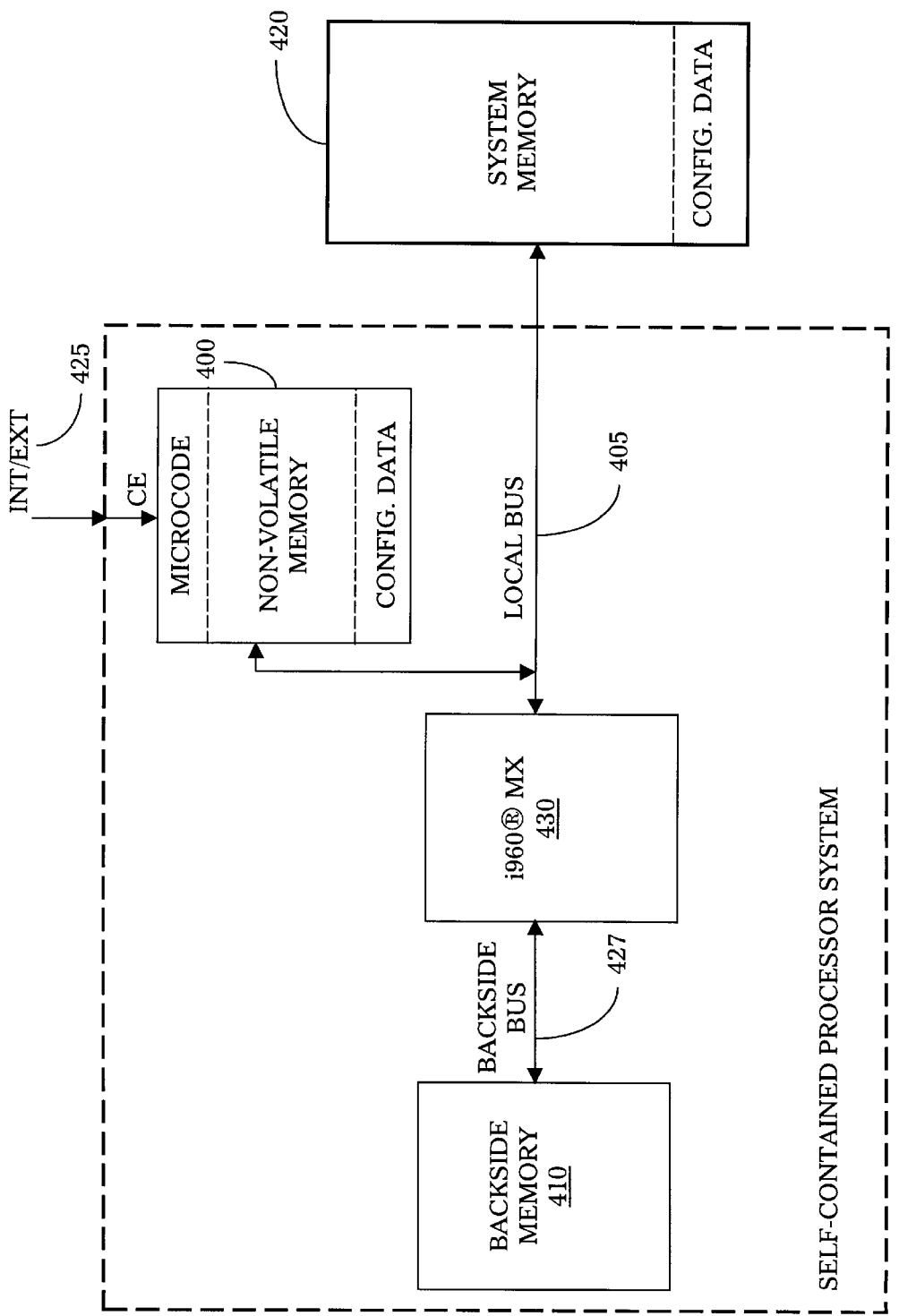
FIG. 4 is a block diagram illustration showing the use of the external boot for control of the location of the configuration data.

A typical self-contained processor system is shown in FIG. 4. The non-volatile memory 400 resides off of the local bus while the system memory 420 resides off of the system bus. The depicted system utilizes a processor such as the i960® MM/MX processor 430, the system also includes a backside bus 427 to interface the processor 430 to high-speed memory (backside memory) 410.

The non-volatile memory 400 coupled to the local bus is only readable by the processor 430 and the configuration data contained therein can not be modified. The system of the present invention includes a signal (INT/EXT 425) to indicate that during the boot process, the configuration data should be accessed from internal or external memory. The configuration data, when accessed from system memory 420 according to the state of the INT/EXT signal, is user definable and may be changed to meet the system design and usage requirements. Alternately, the INT/EXT signal can be set to access the configuration data located in internal memory. This signal INT/EXT is decoded along with the local bus address to control the chip enable of the non-volatile memory. Preferably, the INT/EXT signal is a hard-wired bit which is controllable by the user. Exemplary decoding of the memory address along with the signal INT/EXT is shown in FIG. 5. Thus, the state of the INT/EXT signal will select the physical memory to access for address range A which contains the configuration data.

An additional feature is the fact that the user still has access, regardless of the boot mode chosen, to the external microcode contained in the upper portion of the internal non-volatile memory. This microcode is typically loaded into the backside memory 410 after boot-up or accessed from nonvolatile memory via the local bus. Referring to FIG. 5, address range B containing the microcode always refers to the non-volatile memory for access regardless of the boot mode chosen. This simplifies the design of software drivers since the memory is always selected to be in this address range regardless of the boot mode chosen. Therefore, the location or access of the microcode is not affected by the internal/external memory selection for the location of configuration data.

The module can be fabricated with the microcode and a version of the configuration data stored in the non-volatile memory. Alternate versions of configuration data can be stored in the external system memory. This ability eliminates any need to provide special processing to modify configuration data subsequent to fabrication. Furthermore, the self-contained processor system of the present invention can be configured with the INT/EXT signal selected such that the system boots off of the non-volatile memory and has the capability to subsequently execute as a stand alone module if the operating system software is also loaded into the non-volatile memory.

The invention has been described in conjunction with the preferred embodiment. It is evident that numerous alternatives, modifications, variations and uses will be apparent to those skilled in the art in light of the foregoing description.

What is claimed is:

1. An apparatus comprising:
   a processor coupled to a de-multiplexed system bus and a multiplexed local bus;
   a nonvolatile memory coupled to the local bus, the nonvolatile memory storing internal configuration data and microcode;
   an external system memory coupled to the system bus, the system memory storing external configuration data, wherein the processor receives a selected one of the internal and the external configuration data as boot configuration data in accordance with a state of an internal/external signal coupled to the nonvolatile memory, wherein the processor receives the microcode from the nonvolatile memory regardless of the state of the internal/external signal.

2. The apparatus of claim 1 wherein the processor and the nonvolatile memory form a self-contained processor system.

3. The apparatus of claim 2 wherein the self-contained processor system resides on a single printed circuit board.

4. The apparatus of claim 2 wherein the self-contained processor system is a multi-chip module.

5. The apparatus of claim 1 wherein the processor further comprises a bus translator for communicating information between the multiplexed local bus and the de-multiplexed system bus, wherein the local bus multiplexes address signals and data signals on a same plurality of bus lines, the system bus having a plurality of address lines separate from a plurality of data lines, the system bus coupled to an external device.

6. The apparatus of claim 5 wherein the bus translator further comprises:

control logic for controlling data transfer between the local bus and the system bus;

a data register file storing write data from the processor and providing the write data to the system bus for the external device, the data register file storing read data from the external device and providing the read data to the local bus for the processor, wherein the write data and the read data are communicated between the external device and the data register file using the system bus in accordance with a state of a ready signal communicated to the control logic from the external device; and an address latch to latch write address signals from the local bus such that a write address can be provided to the address lines for each word of write data communicated from the data register file to the external device using the plurality of data lines, wherein the control logic generates wait states when communicating data between the data register file and the external device if the ready signal indicates that the external device is not ready.

7. The apparatus of claim 5, wherein the bus translator further comprises:

burst address logic, the burst address logic receiving an initial write address accompanying a burst of write data from the processor, wherein the burst address logic provides the initial write address using the plurality of address lines and a first word of the burst write data to the external device using the data lines, wherein for each subsequent word of the burst write data the burst address logic increments the initial write address to provide an incremented write address with each subsequent word of burst write data to the external device using the system bus.

8. The apparatus of claim 5 wherein the bus translator further comprises:

a byte enable register file to latch byte enable signals from the local bus such that a write byte enable signal is provided to the system bus for each word of write data communicated from the data register file to the external device in accordance with a ready signal communicated from the external device, wherein the byte enable register file latches byte enable signals from the system bus such that a read byte enable signal is provided to the local bus for each word of read data communicated from the data register file to the processor, wherein the read byte enable signal indicates the valid bytes for each word of read data from the external device, wherein the write byte enable signal indicates valid bytes for each word of write data from the processor.

9. The apparatus of claim 5 wherein the bus translator further comprises:

parity generation logic generating at least one parity bit for each byte of each word of write data communicated to the external device, wherein the parity generation logic computes a calculated parity for each byte of read data from the external device, and parity check logic wherein if the calculated parity does not match a read data parity provided by the external device for each byte of read data then the parity check logic generates a parity error signal to the external device.

10. An apparatus comprising:

a processor coupled to a de-multiplexed system bus and a multiplexed local bus, wherein the local bus multiplexes address signals and data signals on a same plurality of bus lines, the system bus having a plurality of address lines separate from a plurality of data lines;

a local nonvolatile memory coupled to the local bus and an internal/external signal, the local nonvolatile memory storing internal configuration data and microcode, wherein the processor and the local nonvolatile memory form a self-contained processor system;

a system memory coupled to the system bus, the system memory storing external configuration data, wherein the processor receives boot configuration data from one of the system memory and the nonvolatile memory in accordance with the state of the internal/external signal, wherein the processor selects microcode from the nonvolatile memory independently of the state of the internal/external signal.

11. The apparatus of claim 10 wherein the processor and the nonvolatile memory form a self-contained processor system.

12. The apparatus of claim 11 wherein the self-contained processor system resides on a single printed circuit board.

13. The apparatus of claim 11 wherein the self-contained processor system is a multi-chip module.

14. The apparatus of claim 11 wherein the self-contained processor system further comprises:

a bus translator for communicating information between the multiplexed local bus and the de-multiplexed system bus, the system bus coupled to an external device.

15. The apparatus of claim 14 wherein the bus translator further comprises:

control logic for controlling data transfer between the local bus and the system bus;

a data register file storing write data from the processor and providing the write data to the system bus for the external device, the data register file storing read data from the external device and providing the read data to the local bus for the processor, wherein the write data and the read data are communicated between the external device and the data register file using the system bus in accordance with a state of a ready signal communicated to the control logic from the external device; and an address latch to latch write address signals from the local bus such that a write address can be provided to the address lines for each word of write data communicated from the data register file to the external device using the plurality of data lines, wherein the control logic generates wait states when communicating data between the data register file and the external device if the ready signal indicates that the external device is not ready.

16. The apparatus of claim 14 wherein the bus translator further comprises:

burst address logic, the burst address logic receiving an initial write address accompanying a burst of write data from the processor, wherein the burst address logic provides the initial write address using the plurality of address lines and a first word of the burst write data to the external device using the data lines, wherein for each subsequent word of the burst write data the burst address logic increments the initial write address to provide an incremented write address with each subsequent word of burst write data to the external device using the system bus.

17. The apparatus of claim 14 wherein the bus translator further comprises:

a byte enable register file to latch byte enable signals from the local bus such that a write byte enable signal is provided to the system bus for each word of write data communicated from the data register file to the external device in accordance with a ready signal communicated from the external device, wherein the byte enable register file latches byte enable signals from the system bus such that a read byte enable signal is provided to the local bus for each word of read data communicated from the data register file to the processor, wherein the read byte enable signal indicates the valid bytes for each word of read data from the external device, wherein the write byte enable signal indicates valid bytes for each word of write data from the processor.

18. The apparatus of claim 14 wherein the bus translator further comprises:

parity generation logic generating at least one parity bit for each byte of each word of write data communicated from the processor to the external device, wherein the parity generation logic computes a calculated parity for each byte of read data from the external device, and parity check logic wherein if the calculated parity does not match a read data parity provided by the external device for each byte of read data then the parity check logic generates a parity error signal to the external device.

* * * * *